US006404738B1

(12) United States Patent
Reininger et al.

(10) Patent No.: US 6,404,738 B1
(45) Date of Patent: Jun. 11, 2002

(54) DYNAMIC NETWORK BANDWIDTH ALLOCATION FOR MULTIMEDIA APPLICATIONS WITH SOFT QUALITY-OF-SERVICE REQUIREMENTS

(75) Inventors: Daniel Reininger, Princeton; Rauf Izmailov, Middletown, both of NJ (US)

(73) Assignee: NEC USA, Inc., Princeton, NJ (US)

(*) Notice: Subject to any disclaimer, the term of this patent is extended or adjusted under 35 U.S.C. 154(b) by 0 days.

(21) Appl. No.: 09/010,488

(22) Filed: Jan. 21, 1998

(51) Int. Cl.[7] ............................................... G01R 31/08

(52) U.S. Cl. ..................................... 370/236; 370/465

(58) Field of Search ................................. 370/230, 232, 370/233, 234, 235, 236, 358, 395, 401, 410, 465, 468; 709/230

(56) References Cited

U.S. PATENT DOCUMENTS

| | | | | |
|---|---|---|---|---|
| 5,530,695 A | * | 6/1996 | Dighe et al. ................. | 370/232 |
| 5,627,970 A | * | 5/1997 | Keshav ........................ | 370/468 |
| 5,675,384 A | * | 10/1997 | Ramamurthy et al. ...... | 370/468 |
| 5,701,465 A | * | 12/1997 | Baugher et al. ............ | 370/468 |
| 5,886,980 A | * | 3/1999 | Zheng ......................... | 370/230 |
| 5,903,559 A | * | 5/1999 | Acharya et al. ............ | 370/395 |
| 5,903,735 A | * | 5/1999 | Kidder et al. ............... | 370/233 |
| 6,049,528 A | * | 4/2000 | Hendel et al. ............... | 370/235 |
| 6,055,571 A | * | 4/2000 | Fulp et al. ................... | 709/200 |
| 6,067,287 A | * | 5/2000 | Chung-Ju et al. ........... | 370/232 |

OTHER PUBLICATIONS

D.Reininger, D.Raychaudhuri and J. Hui, "Bandwidth Renegotiation for VBR Video Over ATM Networks", in IEEE Journal on Selected Areas, vol. 14, No. 6, Aug. 1996, pp. 1076–1085.*

H. H. Malleson et al., "Optimisation of Bit Rates, for Digitally Compressed Television Services, as Functions of Acceptable Picture Quality and Picture Complexity", IEE Colloquim on "Digitally Compressed TV by Satellite", held at Savoy Place, London on Nov. 1, 1995, pp. 592–596.
J. G. Lourens et al., "Optimisation of Bit Rates, for Digitally Compressed Television Services, as Functions of Acceptable Picture Quality and Picture Complexity", 1995 The Institution of Electrical Engineers, pp. 12/1–12/7.
D. Reininger et al., "VBR MPEG Video Coding with Dynamic Bandwidth Renegotiation", IEEE Proc. of ICC '95.
D. Reininger et al., "Scalable QOS Control for VBR Vedio Servers", Proc. First IEEE Conference on Multimedia Signal Processing, Jun. 1997.
D. Reininger et al., "Statistical Multiplexing of VBR[+] Video", SPIE vol. 3231•0277–786X/97, pp. 177–184.
M. Ott et al., "Adaptive QOS in Multimedia Systems", Proc. Fifth IWQoS '97, Columbia University, New York, May 1997.

(List continued on next page.)

Primary Examiner—Melvin Marcelo
Assistant Examiner—Phoungchau Ba Nguyen
(74) Attorney, Agent, or Firm—Sughrue, Mion, PLLC

(57) ABSTRACT

A new concept of soft quality-of-service (soft-QoS) is developed that bridges the gap between the efficient provision of network-level QoS and the requirements of multimedia applications. Soft-QoS is defined by a satisfaction index (a number that rates users' perceptual quality) and a softness profile (a function that captures the robustness of multimedia applications to network congestion). Another aspect of this invention is a bandwidth allocation scheme for multimedia applications with soft-QoS requirements is presented. The implementation of the bandwidth allocation scheme on a network element realizes a soft-QoS controller. The controller uses the connections' softness profiles to compute a bandwidth allocation that maximizes the minimum satisfaction index of active connections.

20 Claims, 14 Drawing Sheets

OTHER PUBLICATIONS

M. Ott et al., "An Architecture for Adaptive QOS and its Application to Multimedia Systems Design" Computers and Communications, Special issue on QoS.

D. Reininger et al., "Soft Quality of Services with VBR$^+$ Video", Proceedings of International Workshop on Audio-Visual Services over Packet Networks. Sep. 15–16, 1997, Aberdeen, Scotland, UK.

* cited by examiner

| application | critical bandwidth ratio (B) |
|---|---|
| teleconference, surveillance (slow motion) | 0.2-0.32 |
| video-on-demand (action) | 0.28-0.36 |
| multimedia-on-demand (interactive action) | 0.32-0.48 |

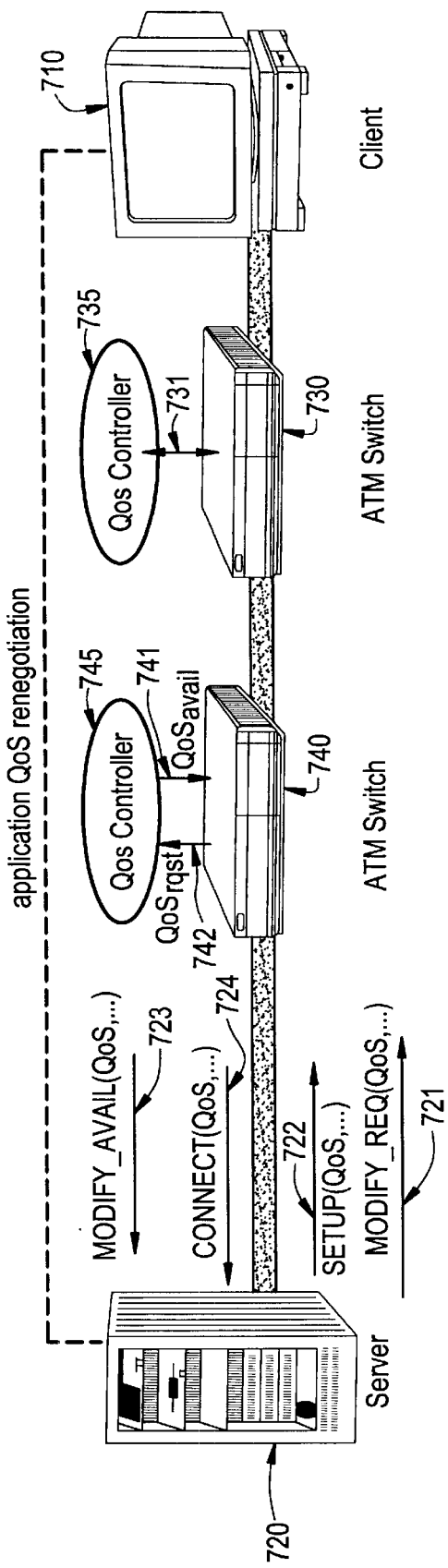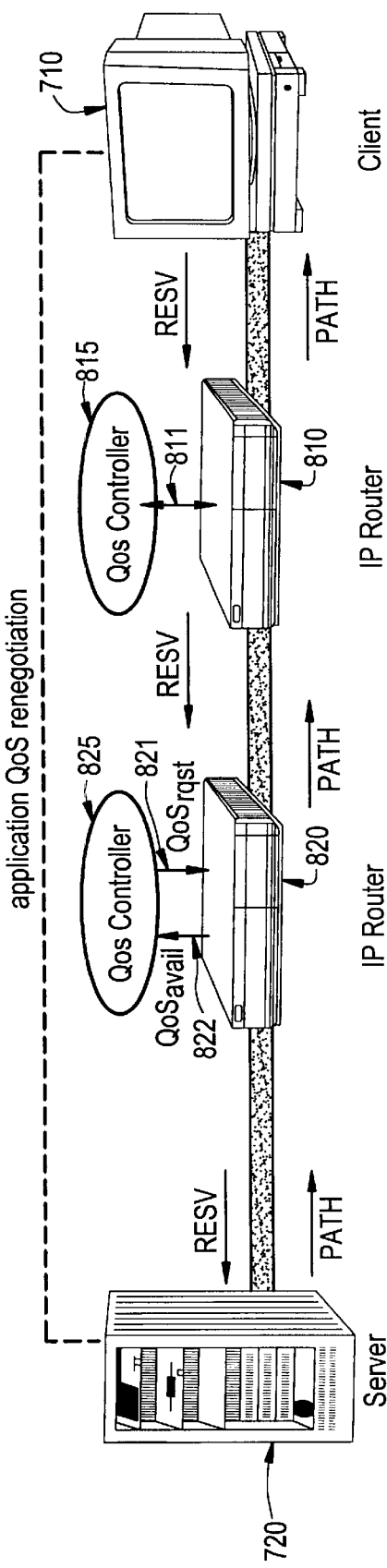

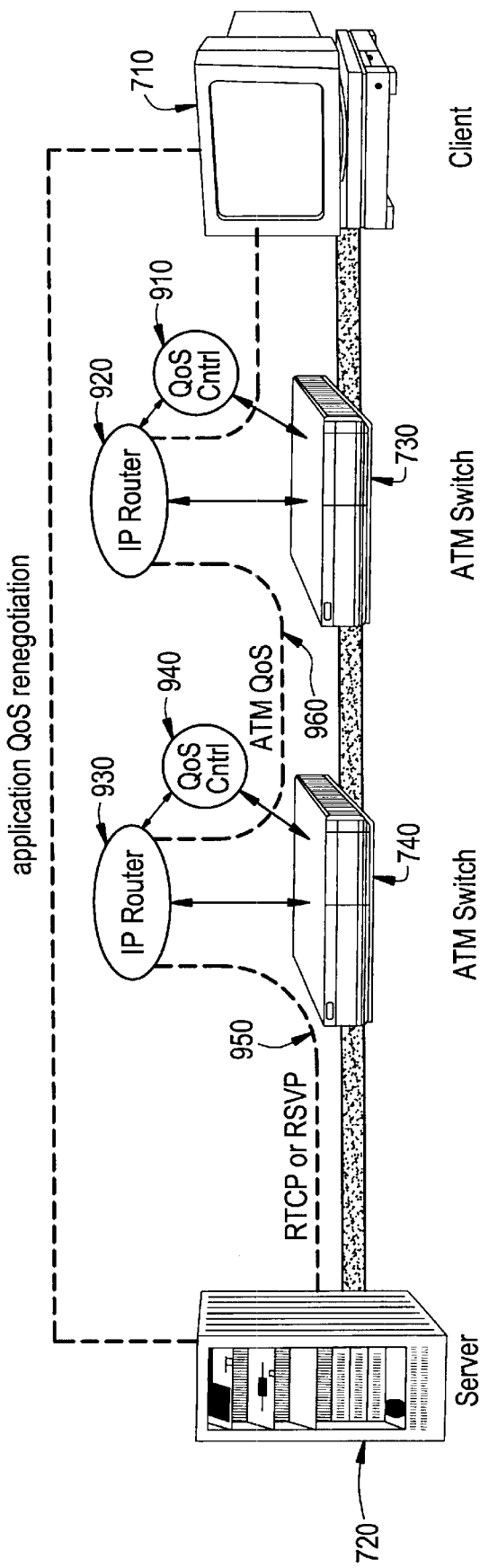

| p | 0.00 | 0.25 | 0.50 | 0.75 | 1.00 | 2.00 |
|---|---|---|---|---|---|---|
| U | 79% | 78% | 78% | 73% | 77% | 77% |
| RSO | 0% | 17.5% | 21.7% | 30.4% | 42.5% | 47.9% |
| RR | 0 | $3.5 \times 10^{-3}$ | $2.8 \times 10^{-3}$ | $6.0 \times 10^{-3}$ | $1.9 \times 10^{-3}$ | $2.8 \times 10^{-3}$ |
| LSR | $1.41 \times 10^{-2}$ | $6.5 \times 10^{-3}$ | $6.0 \times 10^{-4}$ | $1.1 \times 10^{-4}$ | $1.4 \times 10^{-4}$ | $5.6 \times 10^{-4}$ |
| LSMD | 18.5 | 11.3 | 8.1 | 4.6 | 3.3 | 4.0 |
| LSSD | 18.6 | 18.1 | 13.6 | 3.7 | 1.6 | 2.8 |

DYNAMIC NETWORK BANDWIDTH ALLOCATION FOR MULTIMEDIA APPLICATIONS WITH SOFT QUALITY-OF-SERVICE REQUIREMENTS

I. BACKGROUND OF THE INVENTION

IA. Field of the Invention

This invention relates to quality of service (QoS) for network communication. Specifically a new form of QoS, called soft-QoS, is introduced to bridge the gap currently existing between the efficient provision of network-level QoS and the requirements of multimedia applications. This invention is embodied in a network system that uses soft-QoS, in a method for utilizing soft-QoS and a computer program product that enables a network to use soft-QoS.

IB. Related Work

Presently, communication over a network has become widely prevalent. Connections that use such a network require a guarantee of a certain quality of service. Quality of service (QoS) offered by a network connection is measured in terms of QoS parameters. QoS parameters, in conventional systems is expressed in statistical terms such as cell loss rate, delay jitter and cell transfer delay.

In order to provide guarantee of a certain QoS, a network needs to make long-term assumptions on the statistical characteristics of its traffic. But then, network traffic is comprised of various connections with their own respective characteristics. Additionally, assumptions made by a network regarding a specific connection must be valid for its entire duration. Above mentioned, statistical characteristics are obtained in conventional systems using methods including stochastic modeling or statistical analysis of empirical data.

But then, traffic profiles of an interactive multimedia connections is generally unknown when it is setup. Therefore, above mentioned long-term statistical representations are unsuitable for such interactive multimedia connections. Specifically, parameters used in long-term statistical representations do not represent the specific QoS requirements of multimedia applications. It is generally accepted that distributed multimedia applications require a network service that can match the dynamic and heterogeneous bandwidth requirements that are typical of such applications.

FIG. 1 shows an example of how video bit-rate significantly changes over a session. On the x-axis frames corresponding to the video data are represented. Size of the data in terms of number of bits are represented in the y-axis. FIG. 2 shows frame rate from a source and a compounded multimedia traffic on a network.

Moreover, a network has to rely on conservative traffic assumptions to guarantee a certain QoS. Such reliance on conservative assumptions lead to reservation of network capacity far in excess of what is required. Consequently, there is poor network utilization.

It should be noted that problem of poor network utilization due to capacity over-reservation has been addressed by practitioners in this field using VBR+. See D. Reininger, G. Ramamurthy and D. Raychaudhuri, "VBR MPEG Video Coding with Dynamic Bandwidth Renegotiation," Proceedings of ICC (June 1995). VBR+ is a network service class, using which a connection can renegotiate its bandwidth while the connection is in progress.

Using this methodology overall utilization of a network is improved since bandwidth can be dynamically allocated and reallocated during a connection. See D. Reininger, W. Luo, "Statistical Multiplexing of VBR+ video," *Proceedings of SPIE International Symposium on Voice, Video & Data Communications*, Dallas, Tex. (November 1997).

But then, formulae used in connection bandwidth calculation involve QoS parameters like equivalent bandwidth. Consequently reallocating bandwidth changes the QoS of a connection. In such a case, procedures used for bandwidth reallocation, as in VBR+, have to ensure that new QoS parameters satisfy the original QoS requirements of a connection. In order to realize this objective, the authors use a concept of "QoS satisfaction".

Methods known conventionally are based on representing QoS satisfaction as a "hard" binary ("yes/no") parameter. If, for example, the delivered (or estimated) cell loss ratio is larger than a required cell loss ratio, the connection is deemed unsatisfied. This result is notwithstanding however small the discrepancy between the required and delivered cell loss ratio is.

Taking the above into consideration, it is thus clear that using binary parameters lead to an overgeneralization of QoS satisfaction. This has been partially rectified in conventional systems by using two sets of QoS parameters at the setup phase, they being desired QoS and acceptable QoS.

A user connection and a network engage in a sequence of QoS negotiations using the above mentioned two parameters. In such a case, the user connection is assigned acceptable QoS parameters which may be different from the desired QoS originally requested by it. Although this methodology presents an improvement over the earlier mentioned binary characterization of QoS satisfaction, providing a desired and acceptable QoS does not lead to an adequate mechanism to handle QoS that fall between the two. It is amply clear that the region between the QoS boundaries, desired and acceptable, is not used effectively.

Also, conventional systems do not have a QoS satisfaction scheme that can be employed while a connection is in progress. Besides, it is not possible for a network to achieve high utilization while maintaining hard-bound long-term QoS guarantees under the requirements imposed by distributed multimedia-applications.

Therefore, at least the following problems exist in conventional network systems.

"hard" QoS is inadequate for multimedia traffic.

"hard" QoS leads to unsatisfactory utilization of networks.

Conventional QoS satisfaction schemes can not be modified while a connection is in process.

Conventional QoS satisfaction schemes do not provide quality-fair resource allocation since they use equal bandwidth allocation.

II. SUMMARY OF THE INVENTION

It is an objective of this invention to solve the above identified problems in network systems. Specifically, it is an objective of this invention to provide a soft-QoS for balancing network utilization and application-level QoS in distributed multimedia systems.

It is another objective of this invention to use during congestion a soft-QoS for utilizing the tolerance of an application to network bandwidth shortage. It is an objective of the present invention to represent soft-QoS by a satisfaction index and a softness profile.

In case of video transmission, satisfaction index is an indication of perceptual quality. For different multimedia applications, softness profile correlates the satisfaction index to the resulting bandwidth allocation during network congestion. For example, video applications exhibit a non-linear quality response to bit-rate changes. Scaling a video source reduces its bit-rate, but impacts the perceptual quality. While "soft" applications (such as teleconferencing or multimedia-on-demand browsing) can tolerate relatively large reductions in bit-rate, "hard" applications (such as video on-demand or medical applications) cannot tolerate bit-rate scaling without significantly degrading the application-level QoS. Softer applications are more robust to network congestion since they exhibit a slower decay in satisfaction index with increasing bandwidth shortage.

It is yet another objective of the present invention to use softness profiles of various applications in a network to balance bandwidth utilization and user satisfactions. It is yet another objective of this invention to enable softer applications to receive a favorably priced service for their added flexibility to the bandwidth allocation allowing networks to operate at more aggressive utilization regimes.

It is another objective of this invention to address the issues relating to QoS and expand the notion of QoS satisfaction beyond its current "hard" binary status.

Specifically satisfaction index is gradually scaled from "unsatisfied" to "satisfied. Satisfaction index represents the discrepancy, between the requested equivalent bandwidth and the allocated bandwidth during a network congestion. The exact relationship between the satisfaction index and the bandwidth of the connection is described by its softness profile. Softness profile specifies how satisfaction index decreases if only a portion of the requested bandwidth can be actually allocated by the network. If a small bandwidth deficit causes sharp decrease of the satisfaction index, the corresponding softness profile is deemed "hard". "Softer" profiles correspond to cases, where bandwidth deficit cause the satisfaction index to decrease slower. Softness profile can be selected during setup and it can be changed while a session is in progress.

It is yet another objective of this invention to enable applications to choose a softness profile that best suits their needs. For example, video-on-demand (VoD) applications generally tolerate bit-rate regulations within a small dynamic range, (since rate control is achieved through quantizer control). Applications such as surveillance or teleconference may have a larger dynamic range for bit-rate control since video can be displayed over a range of frame-rates below the traditional 30 and 24 frames-per-second. Other multimedia applications may allow a larger range of bit-rate control by resolution scaling. In these examples, VoD applications are matched to a "harder" profile than the other, more adaptive multimedia applications.

It is yet another objective of the present invention to enable applications to choose appropriate softness profiles depending on the nature of the application. For example, users on wireless mobile terminals may select a "softer" profile for an application in order to reduce the connection's cost, while a "harder" profile may be selected when the same application is run on a wired desktop terminal. Thus, adaptive multi-media applications able to scale their video quality could specify their soft-QoS requirements dynamically to control the cost of a session.

In order to achieve the objectives noted above it is provided a distributed multimedia system having a soft quality of service support. Additionally it is provided a distributed multimedia system comprising a client, a server and a network, wherein the client further comprises an application and a network interface card, the server further comprises a terminal quality of service controller, a data source and a server network interface card.

In a preferred embodiment the network further comprises a backbone network, an access network, quality of service controller, the quality of service controller attached to the access network.

Further preferred embodiments include improvements where the service controllers can be personal computers, function servers and embedded systems.

Further preferred embodiments include improvements where the service controllers reside in the edge switch of the backbone network and/or be distributed across the backbone network.

Another aspect of the present invention is a soft-QoS having a softness profile and a satisfaction index. Improvements include a softness profile defined using a satisfaction index and bandwidth ratio, the bandwidth ratio being further defined as a ratio of allocated bandwidth to requested bandwidth, satisfaction index is graded from 2–5 with a granurality of G and said bandwidth ratio is graded from 0–1. Further improvements include mathematical formulations to calculate softness profile which are subsequently described with reference to preferred embodiments.

In yet another preferred embodiment an application can request bandwidth from a network in terms of soft quality of service while connection is in progress, the application can also renegotiate soft quality of service requirements, and the quality of service controllers compute and negotiate bit-rates necessary to maintain quality. Improvements include a preferred embodiment where the renegotiation is invoked by the network or the user. A network may invoke renegotiations to ensure quality-fairness among competing connections. The renegotiation is sent to network switches in yet another preferred embodiment.

Preferred embodiments include a system where the data source is a multimedia bit-rate source and the multimedia data source such as a video data source uses frame rate and frame detail as soft-QoS parameters.

Another aspect of the present invention is a method of processing quality of service renegotiation by a soft quality of service controller comprising receiving a bandwidth request, receiving softness profile associated with the bandwidth request, granting the request if a decrease is requested and granting a request for increase if capacity is available. In a preferred embodiment a request for bandwidth increase is granted by making a preliminary allocation at output port, computing a satisfaction index, using a reallocation algorithm to reclaim additional bandwidth if said satisfaction index is low.

Another aspect of this invention is a reallocating method for reallocating bandwidth in a network, the network comprising donor connections and recipient connections, the recipient connections and the donor connections being associated with a satisfaction profile each, wherein each of the satisfaction profiles maximizes a minimum satisfaction index so that the satisfaction index is within an acceptable range.

Another aspect of the present invention is a reallocation method to reallocate bandwidth among a plurality of donor connection and a recipient connection comprising identifying donor connections with higher satisfaction index, identifying donor connections with higher allocated bandwidth, calculating amount of bandwidth that would be reallocated using softness profiles, wherein an amount of released bandwidth is selected such that the remaining bandwidth reduces said satisfaction index by a unit of granurality G, stopping when satisfaction index of the recipient connection is within a threshold, repeating the above steps until the satisfaction index of the recipient connection is in an acceptable region or satisfaction index of any connection other than the recipient reaches minimum satisfaction and requesting for more bandwidth from network layer if minimum satisfaction is reached.

In a preferred embodiment the donor connections are identified using a method comprising determining a pruning threshold and including a connection in a list of donor connections if the pruning threshold times current allocation bandwidth is larger than the bandwidth required.

Another aspect of the present invention is a method of calculating softness profile by approximation with a piecewise linear function wherein the function correlates satisfaction index and bandwidth ratio, wherein said function consists of a plurality of linear segments, the slope of each linear segment represents a rate at which video quality degrades because of shortages in the allocated bandwidth.

Another aspect of the present invention is a method of calculating bandwidth required to obtain a satisfaction indexes using a formula described in detail subsequently with respect to preferred embodiments.

Yet another aspect of the present invention is a method of admittance control wherein an average low satisfaction rate is less than the maximum low satisfaction rate, wherein the average low satisfaction rate is equal to a probability that long term capacity requirement of the connection is greater than a listed bandwidth.

Another aspect of this invention is a method of admittance control in a network system comprising advertising a reference profile, converting the reference profile into soft-UPC parameters, deriving a two state traffic model using said soft-UPC parameters and adjusting mean and standard derivation of the bandwidth.

In a preferred embodiment adjusting mean and standard deviation comprises determining whether the request is a call arrival or call departure, performing call procedures accordingly. Preferred embodiments include specific methods to perform call arrival and call departure procedures. Yet another preferred embodiment includes parameters to use for advertising during the call set up phase. Yet another preferred embodiment includes mathematical formulae for each of the steps in admittance control which are described in detail subsequently with reference to preferred embodiments.

III. BRIEF DESCRIPTION OF THE DRAWINGS

The above objectives and advantages of the present invention will become more apparent by describing in detail preferred embodiments thereof with reference to the attached drawings in which:

FIG. 7 depicts application QoS renegotiation across a network that uses ATM signalling.

FIG. 8 shows a preferred embodiment that uses IP and provides RSVP connections.

FIG. 9 shows a preferred embodiment that uses soft-QoS controllers over networks that use IP switching over ATM.

FIGS. 11(A)–(D) show examples of the various steps in the core bandwidth allocation procedure.

Figures 12, 13:
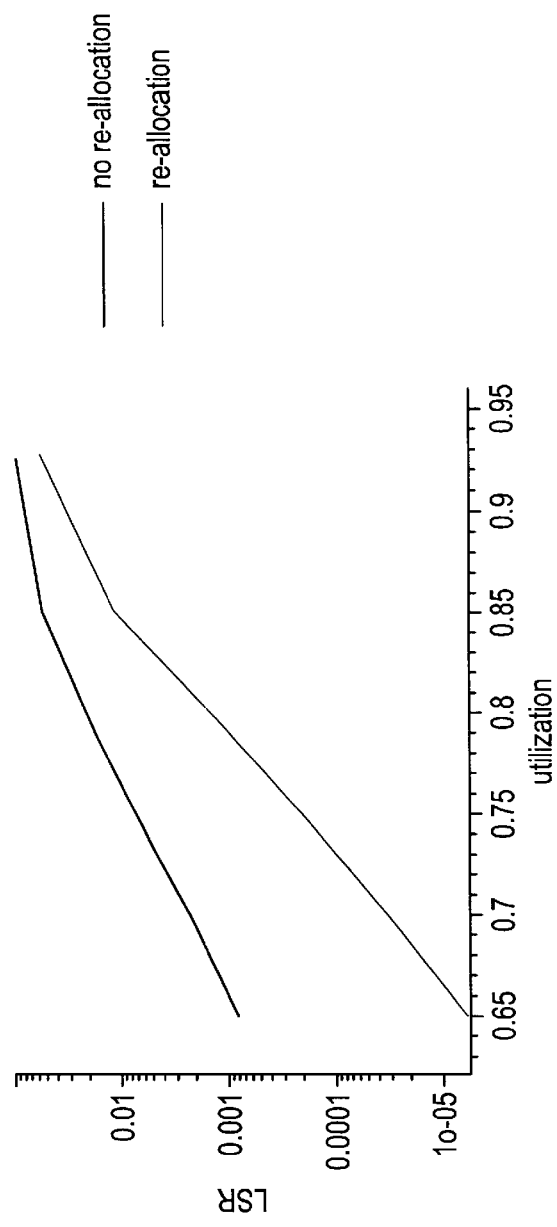

FIG. 12 depicts a table showing the performance of the soft-QoS controller in terms of preselected metrics.

FIG. 13 shows the effect of network utilization on the reallocation rate (RR).

Figure 14:
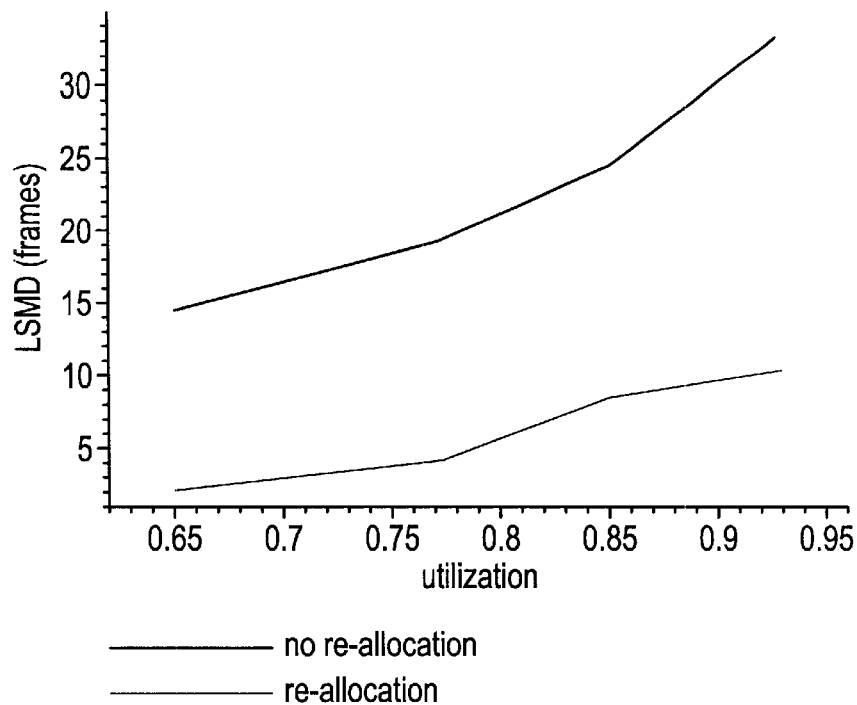

FIG. 14 shows the effect of network utilization on low satisfaction rate (LSR).

Figure 15:
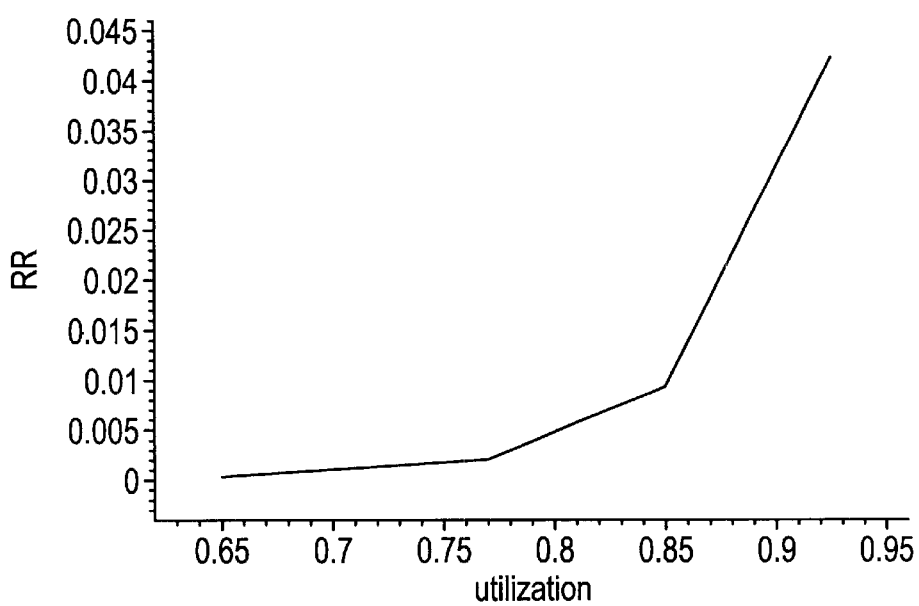

FIG. 15 shows the effect of network utilization on low satisfaction mean duration (LSMD).

Figures 16, 17:
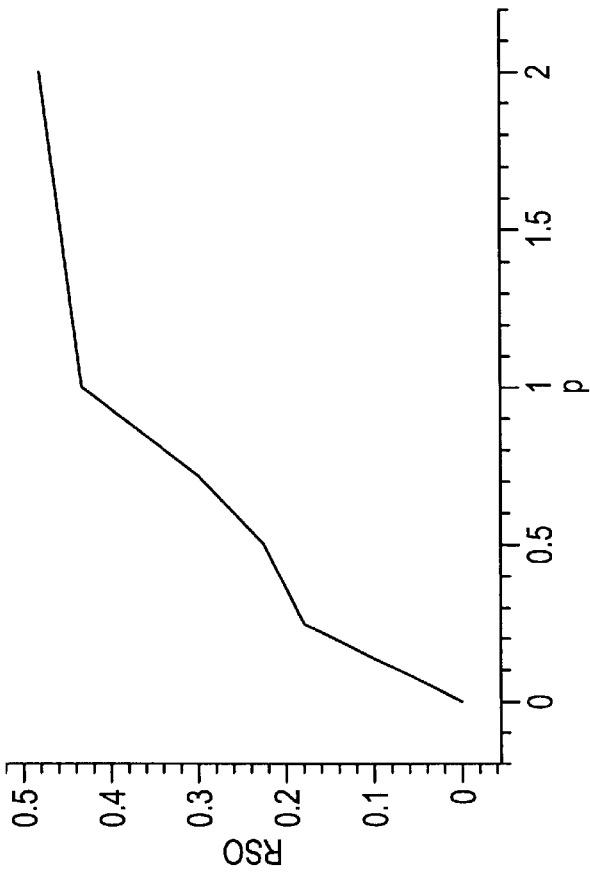

FIG. 16 shows a table depicting the effect of pruning threshold on reallocation performance.

FIG. 17 shows a the effect of pruning threshold on reallocation signalling overhead (RSO).

Figure 18:
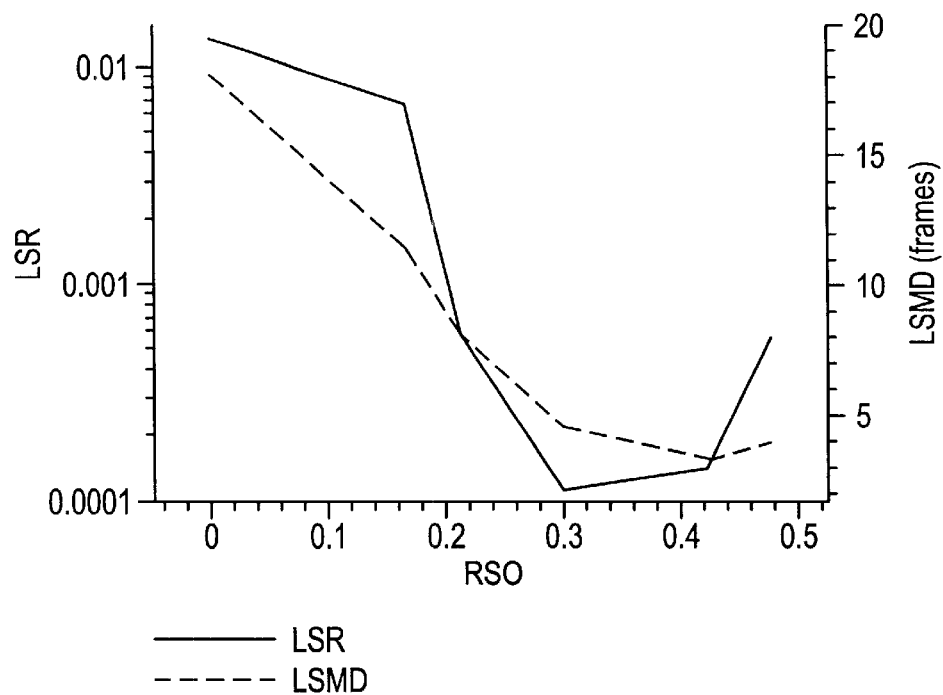

FIG. 18 shows a trade-off between reallocation signalling overhead (RSO) and low satisfaction rate (LSR).

Figure 19:
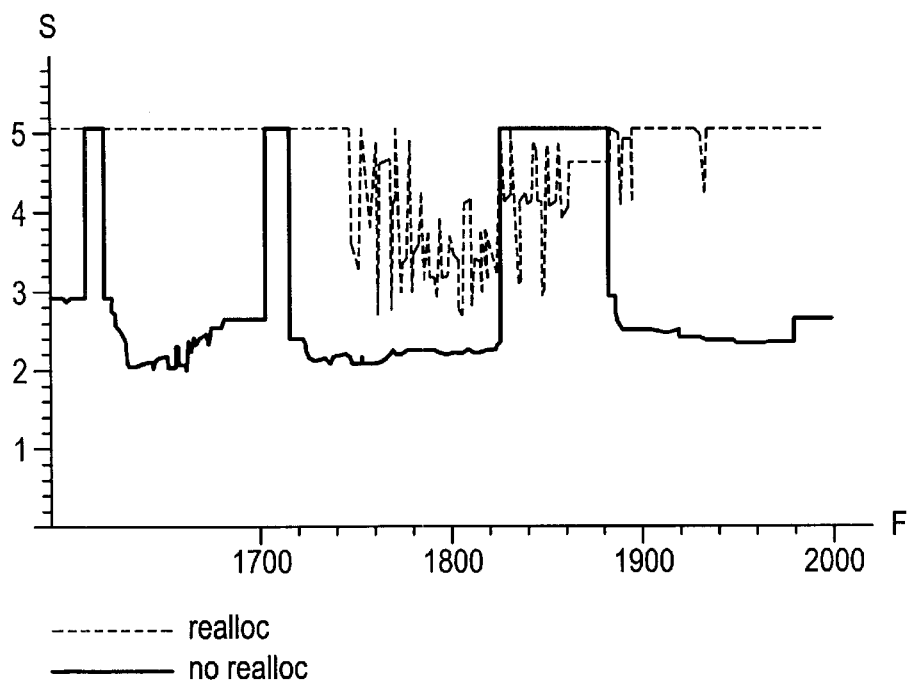

FIG. 19 shows the effect of reallocation on minimum satisfaction index.

Figure 20:
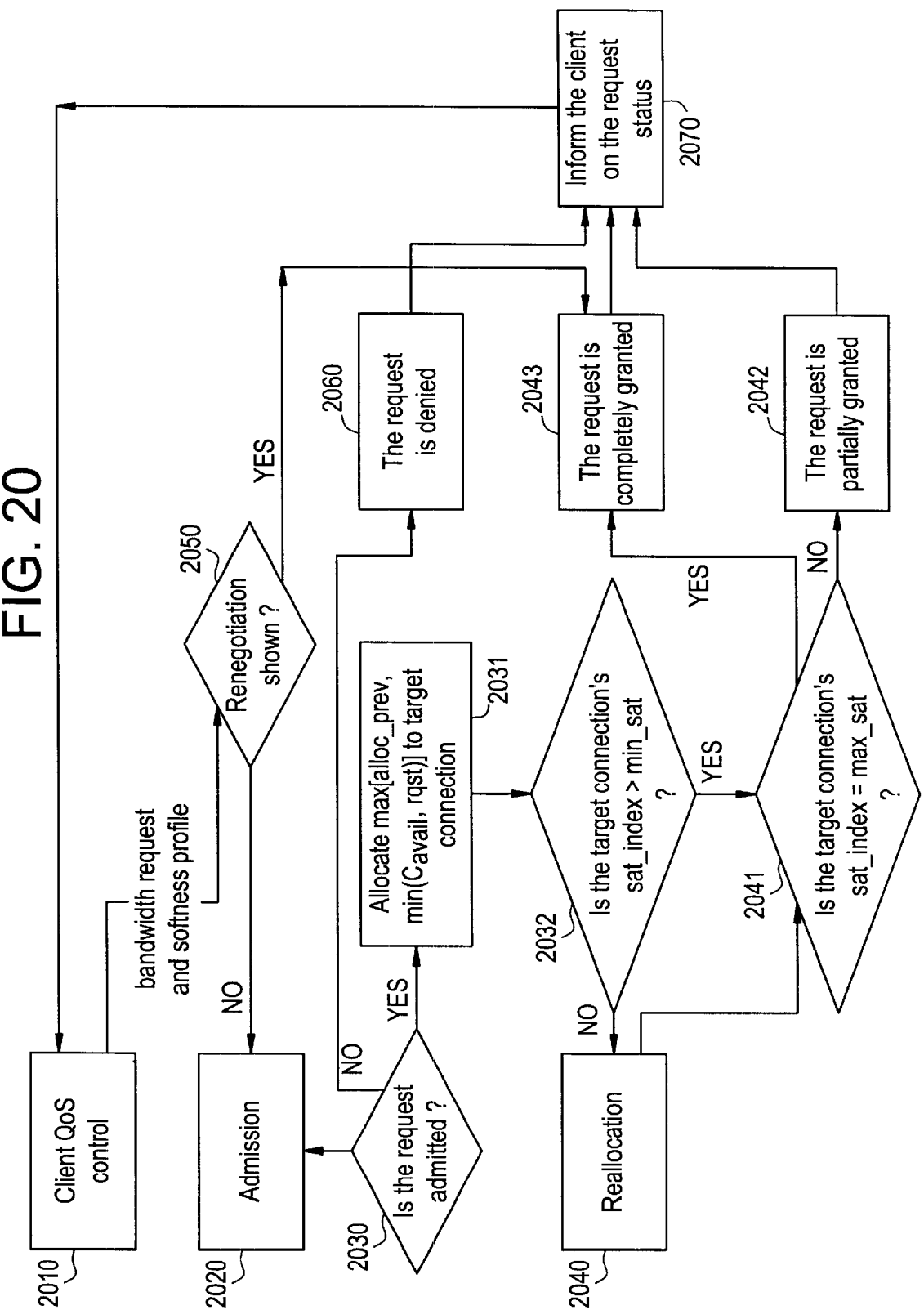

FIG. 20 shows a detailed description of an algorithmic implementation for a soft-QoS controller follows according to a preferred embodiment of the present invention.

Figure 21:
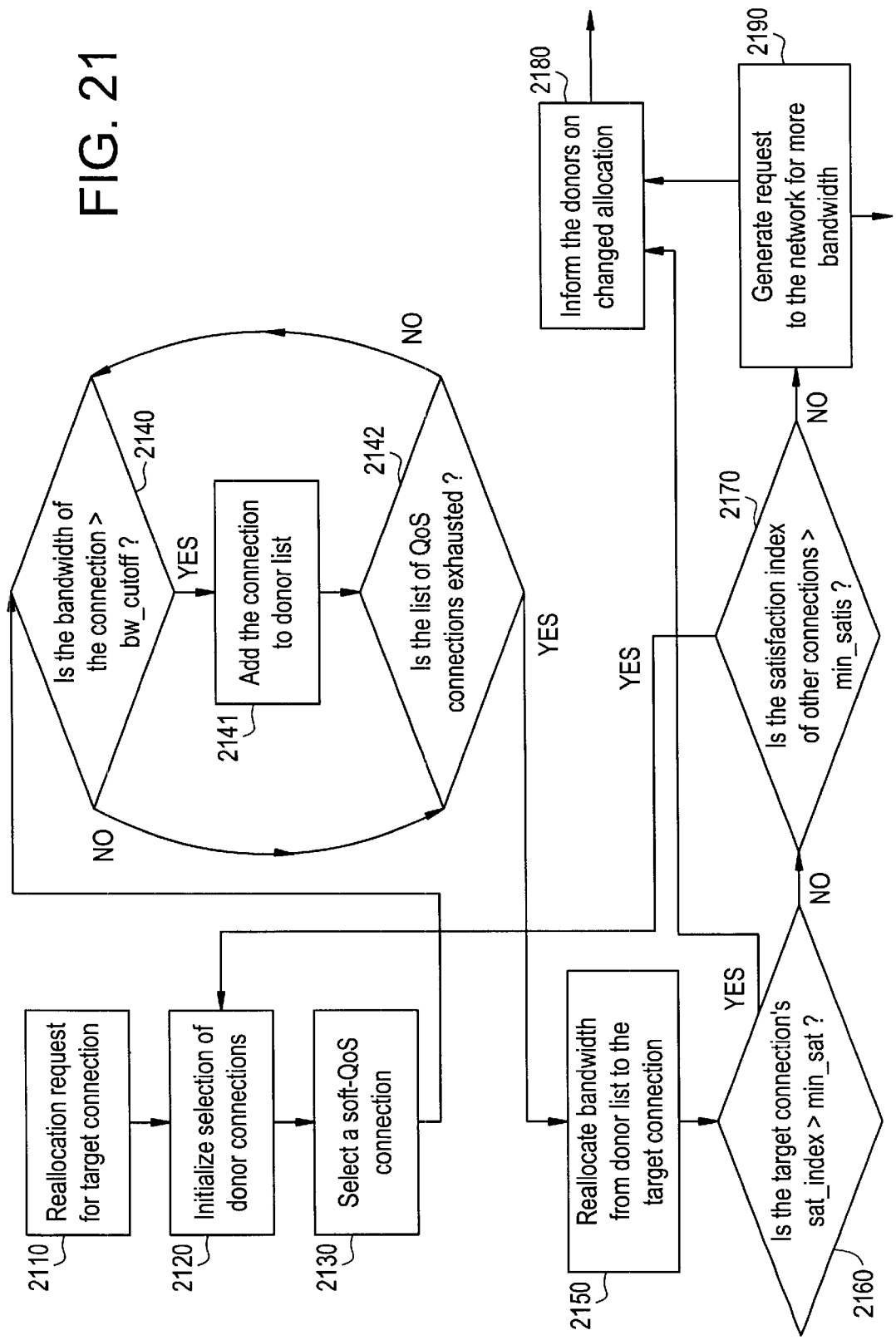

FIG. 21 shows a bandwidth reallocation algorithm according to a preferred embodiment of the present invention.

Figure 22:
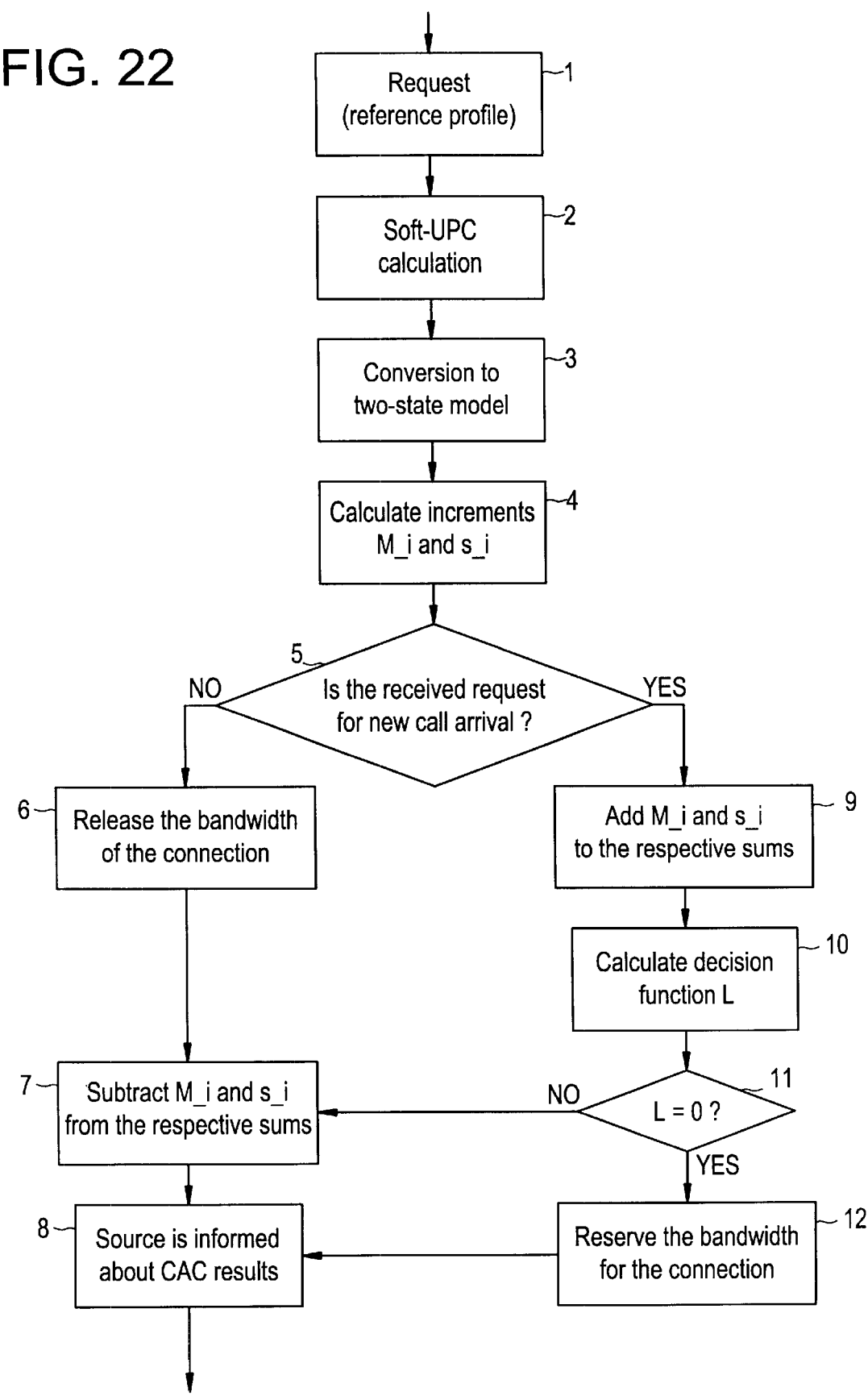

FIG. 22 shows an admission control algorithm according to a preferred embodiment of the present invention.

IV. DETAILED DESCRIPTION

Referring to figures the principles of the present invention is described. Herein, various features, merits and various embodiments of the present invention will be described for a better understanding of this invention. Experiments that show quantitatively the superior advantages of the present invention are also presented with an analysis of their results.

IVA. Soft-QoS and Softness Profile

Softness profile is one of the parameters used in the present invention to specify soft-QoS. A clear understanding of the scope of this invention can be had only with a definition of softness profile. Softness profile is defined using two parameters: satisfaction index and bandwidth ratio. Satisfaction index is a measure of users' perception of quality. Bandwidth ratio is defined as ratio of the network bandwidth actually allocated to the bandwidth requested by the application. Softness profile is a function that correlates the satisfaction index of an application to its requested and allocated network bandwidths.

Herein, several ways of obtaining softness profiles are considered. Multimedia applications generally exhibit non-linear relationship between bit-rate and quality that can be used as one of the ways to specify softness profiles. This non-linear response is sometimes characterized empirically through perceptual, evaluation tests.

In case of video applications, studies have been conducted to assess the quality of various implementation of digital video services like high definition television (HDTV) and direct broadcasting services (DBS). Such a study of MPEG-2 video for television services is presented in J. G.

Lourens, H. H. Malleson, and C. C. Theron, "Optimisation of bit-rates, for digitally compressed television services, as a function of acceptable picture quality and picture complexity", IEE Colloquium on Digitally Compressed TN by Satellite, 1995. This study presents extensive graphs correlating subjective picture quality assessment to various compression bit-rates. It also considers activity and complexity of the video material. From the correlations obtained using the above mentioned approach, softness profiles for video used in various application scenarios can be derived.

Figure 1:
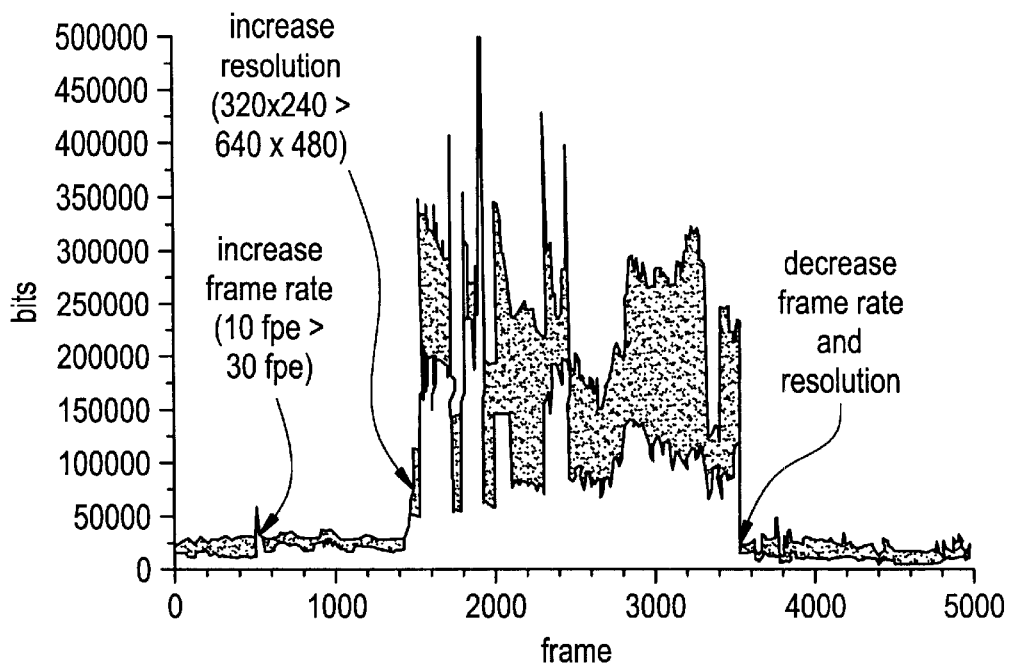
FIG. 1 shows an example of media bit-rate changes in a session.
Figure 2:
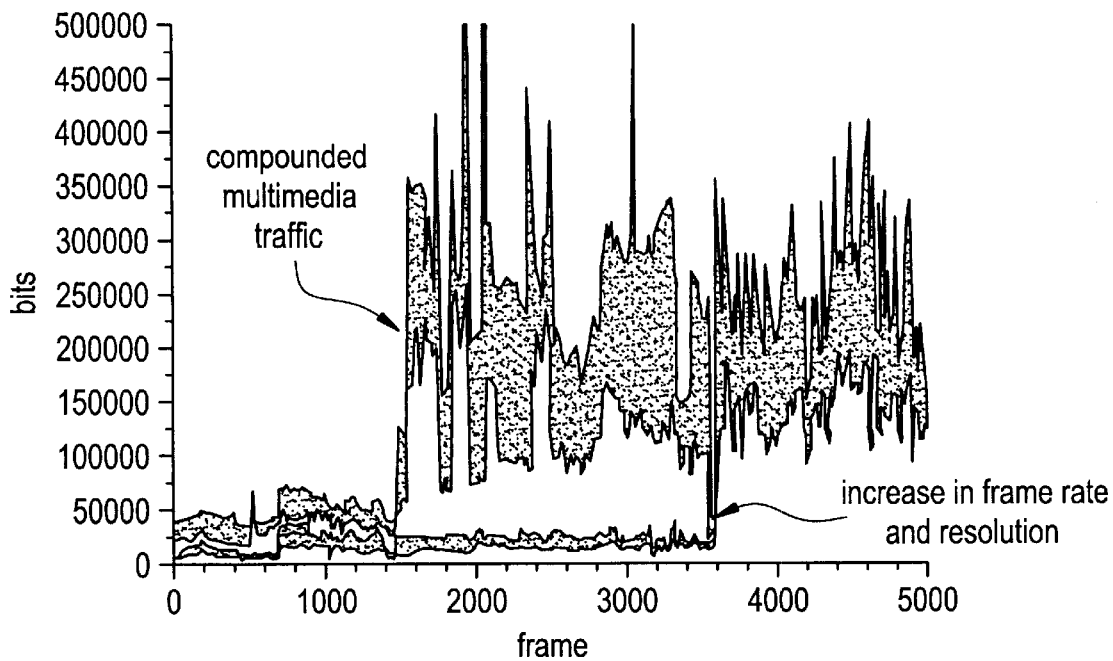
FIG. 2 shows an example of media bit-rate changes in a session compared to the overall multimedia traffic.
Figures 3, 4:
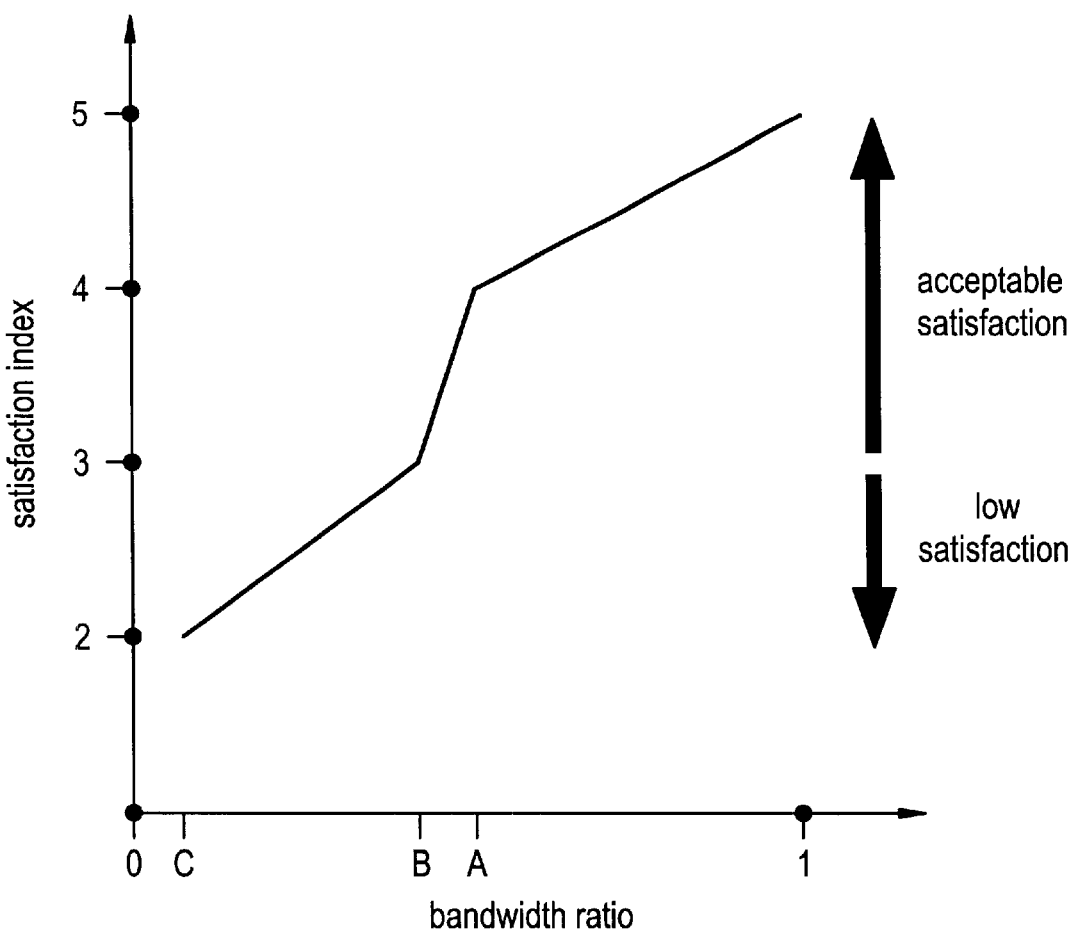
FIG. 3 shows an example of a satisfaction profile.
FIG. 4 shows a table presenting the critical bandwidth ratio for different MPEG-2 video application scenarios.

In a preferred embodiment of the current invention, the softness profile is approximated by a piecewise linear "S-shaped" function, consisting of three linear segments. FIG. 3 depicts this function in the form of a graph of satisfaction index versus bandwidth ratio. Satisfaction index is shown to vary from 0–5 while the bandwidth ratio varies from 0–1. There are three linear segments shown; C-B, B-A and A-1. The slope of each linear segment represents the rate at which video quality degrades (satisfaction index decreases) when the network allocates only a portion of the requested bandwidth: the steeper the slope, the "harder" the corresponding profile.

In the preferred embodiment, the satisfaction index is graded from 2 to 5 with a granularity G. Two operational regions are identified in the preferred embodiment: the range between 3 to 5 is considered an acceptable satisfaction region, while below 3 is a low satisfaction region.

Further, in the preferred embodiment, bandwidth ratio is graded from 0 to 1. The point indicated as B in FIG. 3 is called the critical bandwidth ratio since it separates the acceptable and low satisfaction regions.

In the preferred embodiment, the softness profile function S(r) (where r is the bandwidth ratio) according to the present invention is completely determined by three numbers A, B, C, where $$1 \geq A > B > C \geq 0$$

and

S(1)=5 (excellent), S(A)=4 (very good), S(B)=3 (good), S(C)=2 (poor), S(0)=0.

For a bandwidth ratio r between 0 and 1, the corresponding satisfaction index S(r) is calculated by the formulae:

$$L = \begin{cases} 0 & \text{if } 0 \leq r \leq C, \\ 1 & \text{if } C \leq r \leq B, \\ 2 & \text{if } B \leq r \leq A, \\ 3 & \text{if } A \leq r \leq 1, \end{cases}$$

$$S(r) = \begin{cases} 2 & \text{if } L = 0, \\ (r-C)/(B-C) + 2 & \text{if } L = 1, \\ (r-B)/(A-B) + 3 & \text{if } L = 2, \\ (r-A)/(1-A) + 4 & \text{if } L = 3. \end{cases}$$

Softness profile is also used for calculating the amount of bandwidth (bandwidth ratio r) required to obtain the desired satisfaction index s:

$$L = \begin{cases} 0 & \text{if } 0 \leq s \leq 2, \\ 1 & \text{if } 2 \leq s \leq 3, \\ 2 & \text{if } 3 \leq s \leq 4, \\ 3 & \text{if } 4 \leq s \leq 5, \end{cases}$$

$$r(s) = \begin{cases} C & \text{if } L = 0, \\ (s-2)/(B-C) + C & \text{if } L = 1, \\ (s-3)/(A-B) + B & \text{if } L = 2, \\ (s-4)/(1-A) + A & \text{if } L = 3. \end{cases}$$

The present invention can also be practiced using further quantification of softness profile for different video applications. In a preferred embodiment softness profile characterization derived from studies detailed in J. G. Lourens, H. H. Malleson, and C. C. Theron, "Optimisation of bit-rates, for digitally compressed television services, as a function of acceptable picture quality and picture complexity", IEE Colloquium on Digitally Compressed TN by Satellite (1995) is used. In the above mentioned study a statistical model derived from empirical results obtained for MPEG-2 television applications show that A=1.067−B, C=0.667−B. FIG. 4 presents an application-dependent range for the critical bandwidth ratio, B.

IVB. Soft-QoS Controller for Multimedia Applications

Figure 5:
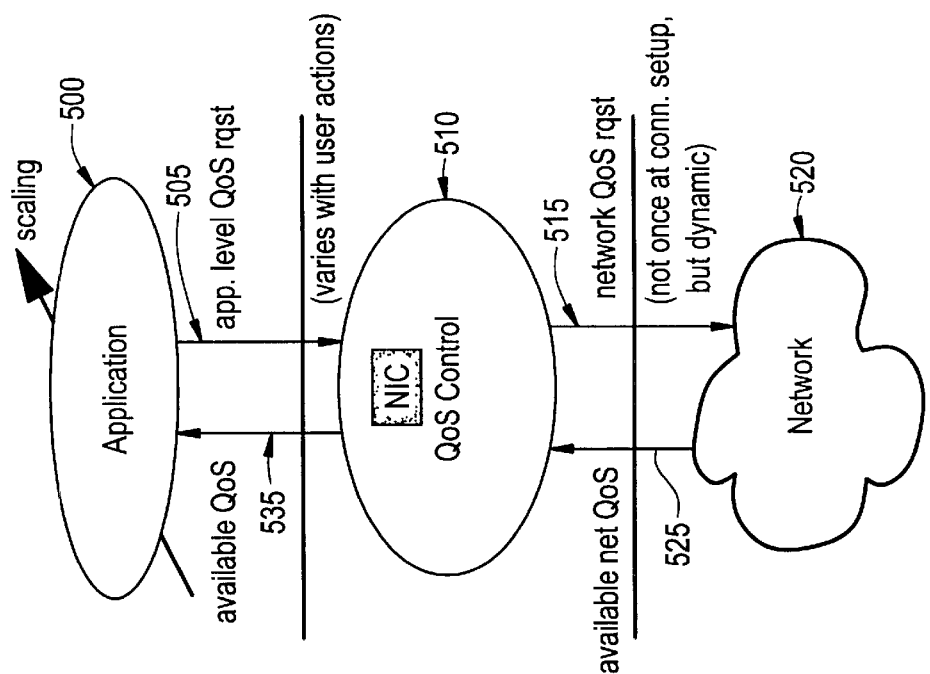
FIG. 5 shows a QoS API according to the present invention.

FIG. 5 shows a QoS request by an application according an aspect of the present invention. An application 500 seeks additional bandwidth. Arrow 505 represents an application level QoS request. The format of this request varies with actions typical of the application. The request is received by a network interface card 510 which also performs QoS control. This card interprets the application QoS request and converts it into a network QoS request using 515. According to an important aspect of this invention it is to be noted that 515 is maintained as a dynamic link, and not just a one time setup event. The network 520 responds by providing available network QoS in 525, which is then provided to the application in 535.

Figure 6:
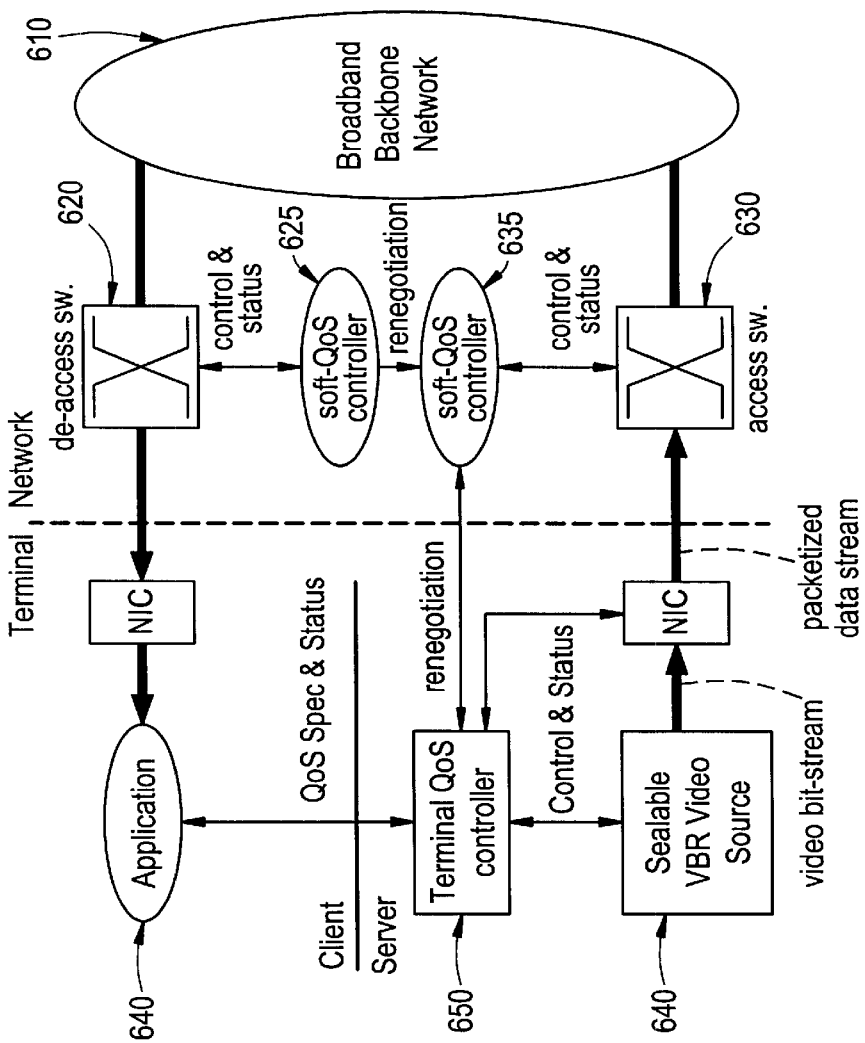
FIG. 6 shows a system model for a distributed multimedia system with soft-QoS support.

FIG. 6 shows an example of a system model for a distributed multimedia system with soft-QoS support according to the present invention. A video delivery application where a client terminal requests a video title from a remote server over a broadband backbone network 610 is considered as an example. At the connection setup, an application 660 requests the desired QoS from a server and a network. For video, the quality requested from the server is described in terms of frame-rate and frame-detail (given by a combination of spatial and frequency resolution). The quality requested from the network is a soft-QoS specification, characterized as a satisfaction index and a softness profile. While a connection is in progress, this application can renegotiate its QoS requirements.

At the server, the terminal QoS controller 650 computes and renegotiates the bit-rate necessary to maintain a desired target quality. The renegotiation requests are sent to soft-QoS controllers 625 and 635 on the network's switches through access networks using an access and deaccess software components 630 and 620.

While renegotiations are being processed, and during network congestion, a variable bit-rate (VBR) source 640 uses rate control to scale its bit-rate and quality to ensure that the generated traffic conforms to the allocated bandwidth.

FIGS. 7–9 show conceptual implementation of systems detailing various network mechanisms for dynamic QoS support according to various preferred embodiments of the present invention.

FIG. 7 depicts application QoS renegotiation across a network that uses ATM signalling. Client 710 is connected to server 720 across an ATM network through ATM switches 730 and 740. Soft-QoS controllers 735 and 745 are connected to the ATM switches. Setup 722 and modification requests 721 are made by the server to the network. Newly established connections 724 and modification availability 723 are received by the server.

FIG. 8 shows a preferred embodiment that uses IP instead of ATM and provides RSVP connections. RSVP is a signalling mechanism protocol for quality of service provision. It follows the IETF standard quality of sevice provision. In this case, soft-QoS Controllers 815 and 825 are connected to IP Routers 810 and 820.

FIG. 9 shows a preferred embodiment that uses soft-QoS controllers over the relatively new technology of IP switching over ATM. In this case, QoS controllers 910 and 940 are connected to both IP routers 920 and 930 as well as ATM switches 730 and 740.

IVB. Algorithm for Soft-QoS Controller

Soft-QoS control algorithm is an important aspect of the present invention. The soft-QoS controller provided by this invention receives soft-QoS requests. It then processes QoS renegotiations based on requested bandwidth and associated softness profiles which characterize soft-QoS. Renegotiations that request a decrease of allocated bandwidth are fully granted, while requests that request an increase of bandwidth are granted only if capacity is available.

If a renegotiation request for increasing bandwidth, a preliminary allocation is made based on the available capacity at the output port of the switch where the connection is to be routed. When such a preliminary allocation will result in a satisfaction index within the a preselected low satisfaction region, a reallocation algorithm is used to reclaim additional bandwidth from preexisting connections operating in the acceptable satisfaction region. The connections from which bandwidth is to be reclaimed are called donors. The connection that benefits from the reallocation is called the recipient. The reallocation algorithm uses the connections' satisfaction profiles to maximize the minimum satisfaction index of all connections subject to maintaining the satisfaction of all donors within the acceptable satisfaction region.

This optimization criteria leads to a rational allocation that considers all the connections' soft QoS requirements. The performance of the inventive algorithm in terms of the probability of operating at acceptable satisfaction for different network loads are the main focus of the experimental results present as part of this specification. This probability increases if the admission policy avoids relatively large renegotiation requests requiring a minimum allocation that compromise the satisfaction of on-going connections.

A detailed description of an algorithmic implementation for a soft-QoS controller follows. The description follows the flow chart in FIG. 20.

Step 2050 checks if the requested bandwidth is smaller than the currently allocated bandwidth for the connection (renegotiation down). If it is, the request is completely granted. Else, the connection is requesting a bandwidth increase (renegotiation up). Then, in step 2020, each new request for renegotiation up undergoes an admission test. The test heuristically estimates if at least the minimum satisfaction can be achieved for all active connections once the request is accepted using the allocated capacity and the softness profiles of active connections. Connections continue to operate with their previously allocated capacity if their request is rejected in step 2060 by the admission procedure.

Once a request is admitted in step 2030, a preliminary allocation is made in step 2031 based on the available capacity. This allocation is at least as large as the currently allocated bandwidth for the connection. Step 2032 checks that the satisfaction index obtained from the preliminary allocation is above a minimum satisfaction level. If it is, step 2041 checks if the connection achieves maximum satisfaction with the preliminary allocation. If the connection achieves maximum satisfaction, the request is fully granted in step 2043; else the request is partially granted in step 2042. When the preliminary allocation results in satisfaction index below the minimum satisfaction, the reallocation algorithm is used in step 2040 to reclaim bandwidth from connections operating above minimum satisfaction, using the connections' satisfaction profiles.

The bandwidth reallocation algorithm is invoked if a connection, V, requires more bandwidth than is available in order to achieve its minimum satisfaction level.

The bandwidth reallocation algorithm shown in FIG. 21 maintains the satisfaction level of all connections as high as possible. Specifically, the minimum satisfaction index of all connections has to be larger than a network selectable threshold index, min.satisfaction. Next, the operation of-the core bandwidth reallocation algorithm is described. Since at a given time, connections have different satisfaction indexes, the reallocation algorithm identifies those connections that have the highest satisfaction index and the highest allocated bandwidth. Choosing connections with the highest satisfaction index as primary candidates for reallocation (donor connections) keeps the minimum satisfaction index of all active connections as high as possible.

Further, pruning the list of donor connections by selecting only connections with the highest allocated bandwidth as primary candidates for reallocation allows the network to control the number of reallocations (signalling load). This selection is determined by a pruning threshold (p). A connection is included in the list of donors if its current allocated bandwidth times the pruning threshold is larger than the bandwidth needed for the recipient. The smaller the pruning threshold, the fewer are the connections included in the donor list (if p=0, no connections will be included), and vice versa.

Using the softness profile formulae described earlier, the reallocation algorithm calculates the amount of bandwidth that could be reallocated from the donor connections to V. In these calculations, the amount of the released bandwidth is such that the remaining bandwidth reduces the satisfaction index of the donor connections by a unit of granularity, G.

In step 2110 a reallocation is requested for a target connection. In step 2120 a selection of donor connections are initialized. In step 2130 a soft-QoS connection is selected. If the bandwidth of the selected connection is above a predetermined cutoff, the connection is added to a list of donor connections in step 2141. This is repeated in steps 2140–2142 until all QoS connections are exhausted. Some bandwidth is reallocated from the donor list in step 2150. In step 2160 the algorithm determines if the satisfaction index of the target connection is above a minimum satisfaction index. If so, the donor connections are informed of the reallocation in step 2180. If not, a second determination is made in step 2170 to see if the satisfaction index of all other connections are above minimum satisfaction. If so, the algorithm goes back to step 2120 and the procedure is repeated. If not, the algorithm requests the network for additional bandwidth in step 2190.

As a result of the core bandwidth reallocation procedure, the satisfaction index of donor connections decreases by G, while the satisfaction index of the recipient connection (V) increases. The reallocation algorithm stops when the satisfaction index of the recipient connection is within the acceptable region.

Otherwise, the core reallocation procedure is repeated until either the satisfaction index of V is in the acceptable region, or the satisfaction index of other active connections reaches min.satisfaction, the boundary between acceptable and low satisfaction regions. In the latter case, the system invokes a request for more bandwidth from the network layer.

The results of the core bandwidth reallocation procedure is illustrated in FIG. 11, where 10 active connections (denoted as A, B, . . . J) are displayed as dots on their respective softness profiles. For example, the satisfaction level of connection A is 5 (the maximum), the satisfaction level of connections I and J is 3.5, which is above the min.satisfaction level 3, and the satisfaction level of connection V is below the min.satisfaction. The algorithm sequentially reallocates bandwidth to connection V, in order to bring its satisfaction level above min.satisfaction.

At Step 0, connection A is identified as donor connection, and part of its bandwidth, is reallocated to V. This reduces the satisfaction level of A by the granularity G, which is 0.25 in this example. It also increases the satisfaction level of V. The result is shown on Step 1. In this step, the algorithm assembles the new list of donor connections, which includes A and C. The connection B is not included in the list of donor connections, its bandwidth is deemed too small for V. The result is shown on Step 2. In this step, the new list of donor connections include A, C and D (E is not included for the same reasons as B on the previous step), the final result of reallocation is shown in Step 3, where the satisfaction index of V is above min.satisfaction. The algorithm now adjusts the bandwidths of A, C, D and V and informs these connections of their new allocations.

IVC. Admission Control Algorithm

In order to receive soft-QoS guarantees from the network, users are required to specify a reference usage profile when they initiate a connection.

Let R(t) be the aggregate long-term capacity requirement of the connections. The goal of our soft-CAC algorithm is to guarantee that $$LSR = \Pr[R(t) > C] \leq \delta_N = LSR_{max},$$

where $\delta_N$ is the maximum low satisfaction rate, $LSR_{max}$, declared in the user-network contract and C is the link bandwidth.

The soft-CAC algorithm depicted in FIG. 22 works in the following way. The connection advertises its reference profile in step 1 using the parameters:

$$\{R_B, \Delta_{max}, S_H^{-1}(sat_{min})\}.$$

where $R_B$ is a base-line rate, $\Delta_{max}$ is the maximum expected excursion from $R_B$ and $S_H^{-1}(sat_{min})$ is the hardest profile to be used during the session. The parameters of the reference profile can be estimated from heuristics, based on past usage patterns and/or hardware constraints.

The reference profile is converted in step 2 into soft-UPC parameters UPC=$(\lambda^s_p, \lambda^s_s, B^s_s)$ by the formulae:

$$\begin{cases} \lambda^s_p = (R_B + \Delta_{max}) \cdot S_H^{-1}(sat_{min}) \\ \lambda^s_s = R_B \cdot S_H^{-1}(sat_{min}) \\ B^s_s = \lambda^s_p \cdot T_{on} \end{cases}$$

wherein $T_{on}$ is the on period for the "on-off" rate process that models the source's bit-rate.

The soft-QoS parameters are used in step 3 to convert the system into two-state model with the high and low rates ($\lambda_H$ and $\lambda_L$) occur with probabilities $P_{on}$ and $(1-P_{on})$ respectively, where $$\begin{cases} \lambda_H = \min\left[1, \frac{T_{on}}{T_N}\right] \cdot \lambda^s_p + \left[1 - \frac{T_{on}}{T_N}\right]^+ \cdot \lambda^s_s, \\ \lambda_L = \left[1 - \frac{T_{on}}{T_N}\right]^+ \cdot \lambda^s_s, \\ P_{on} = \frac{T_{on}}{T_{on} + T_{off}} = \frac{\lambda^s_s}{\lambda^s_p} \end{cases}$$

where C and B are the link bandwidth and buffer space for VBR$^+$ connections, and the basic time interval is $T_N$=B/(2C).

At the next step (4), the algorithm calculates the increment ($M_i$, $S_i^2$) by formulas $$\begin{cases} m_i = R_B(i) \cdot (S_H(i))^{-1}(sat_{min}) \\ S_i^2 = (\lambda_H^i - \lambda_L^i)^2 P_{on}(1 - P_{on}) = R_B^i \Delta^i_{max}(S_H^{-1}(i)(sat_{min}))^2 \end{cases}$$

wherein i refers to a connection, $R_B$ (i) is a baseline rate for the connection, $S_H^{-1}$ (i)(sat$_{min}$) is a bandwidth ration corresponding to sat$_{min}$, $\lambda^S_H$ and $\lambda^S_L$ are high and low rates, $\Delta_{max}$ is a maximum expected excursion from $R_B$ (i) and $P_{on}$ is a probability of $\lambda_H^S$ occurring.

If the request is a call departure (which is tested in step 5), the algorithm releases in step 6 the call's bandwidth and subtracts the parameters in step 7 ($m_i$, $s_i^2$) to the respective sums:

$$\begin{cases} M_R^{new} = M_R^{old} - \lambda^s_s \\ S_R^{2new} = S_R^{2old} - (\lambda_H - \lambda_L)^2 \cdot P_{on} \cdot (1 - P_{on}) \end{cases}$$

wherein $M_R^{new}$ and $S_R^{2~new}$ are new mean and variance $M_R$ and $S_R^{2~old}$ are old mean and variance φ is a gaussian distribution function $\delta_N$ is a maximum low satisfaction index and C is a link bandwidth.

After that, the information regarding call release is sent in step 8 to the call originator.

Otherwise, if the request is a call arrival the algorithm adds the mean and variance in step 9 to the respective sums as follows.

$$\begin{cases} M_R^{new} = M_R^{old} + \lambda^s_s \\ S_R^{2new} = S_R^{2old} + (\lambda_H - \lambda_L)^2 \cdot P_{on} \cdot (1 - P_{on}) \end{cases}$$

and the decision function L is calculated in step 10 by the formula:

$$L = L(M_R, S_R) = \begin{cases} 0 & \text{if } M_R + S_R \Phi^{-1}(1 - 2\delta_N) \leq C \\ 1 & \text{otherwise} \end{cases}$$

wherein $M_R^{new}$ and $S_R^{2~new}$ are new mean and variance $M_R$ and $S_R^{2~old}$ are old mean and variance φ is a gaussian distribution function
$\delta_N$ is a maximum low satisfaction index and
C is a link bandwidth.

The function L is used in the key decision step 11 of the CAC algorithm: if L=0, the call is accepted and it is rejected otherwise. If the call is accepted, the bandwidth is reserved in step 12 and the source is informed in step 8. Otherwise, the parameters ($M_2$, $S_R^2$) are readjusted in step 7 and the source is informed in step 8 that its request is denied.

The network uses the reference profile for call admission control. Admitted users can renegotiate their bandwidth requirements and softness profiles. The network agrees to provide soft-QoS to renegotiation requests within the reference profile. A request is considered to be within the reference profile if the equivalent bandwidth associated to minimally satisfy the request is within the bounds specified in the reference profile.

Soft-QoS provision implies the allocation of bandwidth to achieve above minimum satisfaction on the softness profile, subject to constraints on global (class-wise) service parameters such as: LSR≦$LSR_{max}$ and outage duration of at most and blocking probability $P_b \leq P_b^{max}$.

Figure 10:
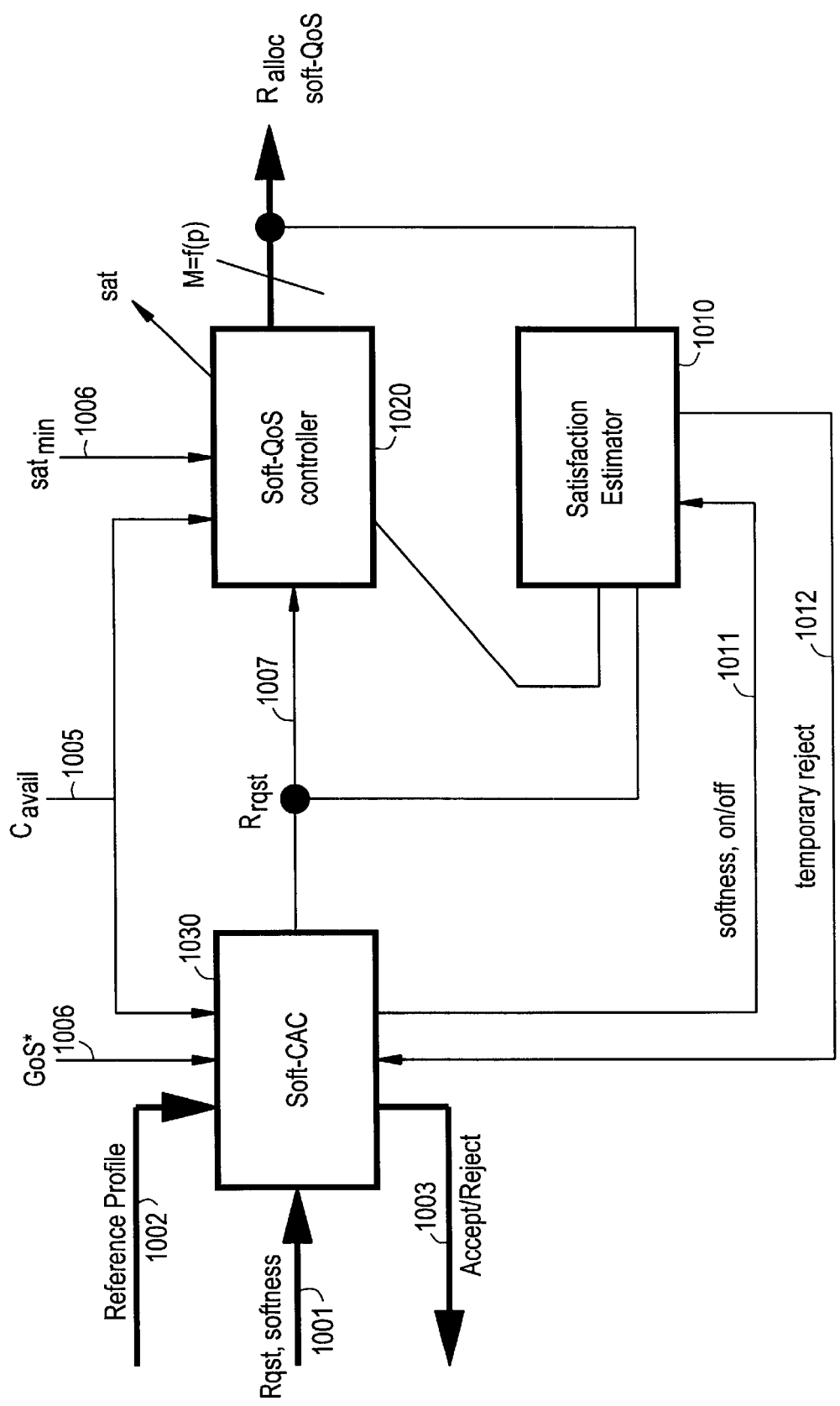
FIG. 10 shows an adaptive bandwidth allocation system model according to the present invention.
Figure 11A:
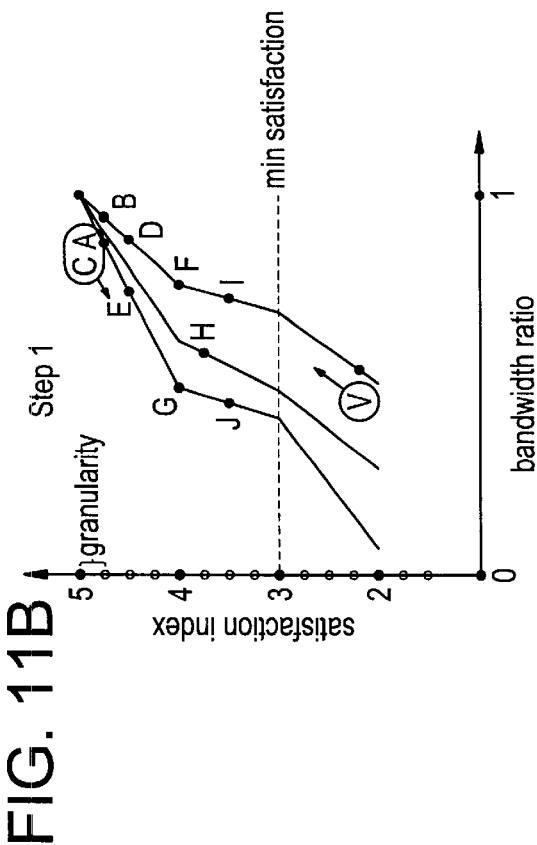
Figure 11B:
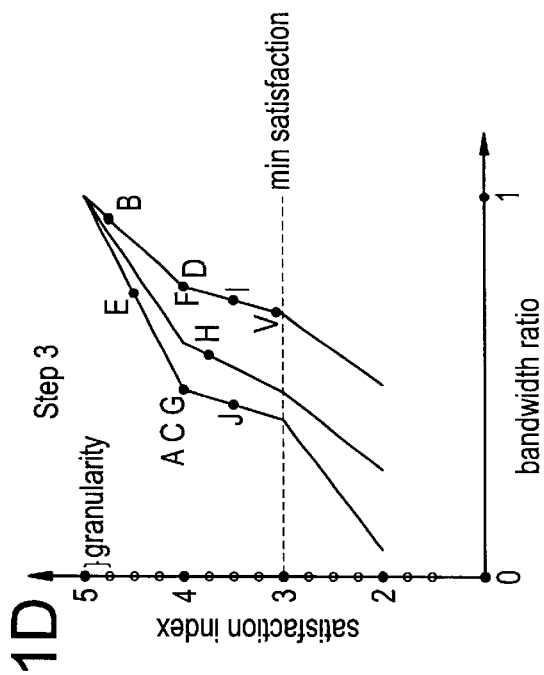
Figure 11C:
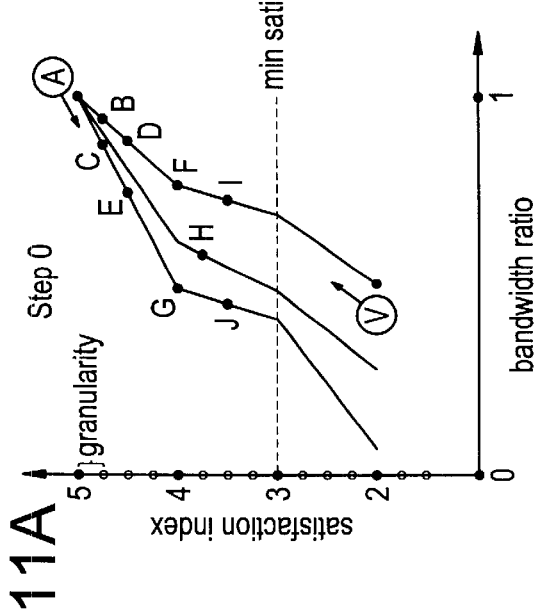
Figure 11D:
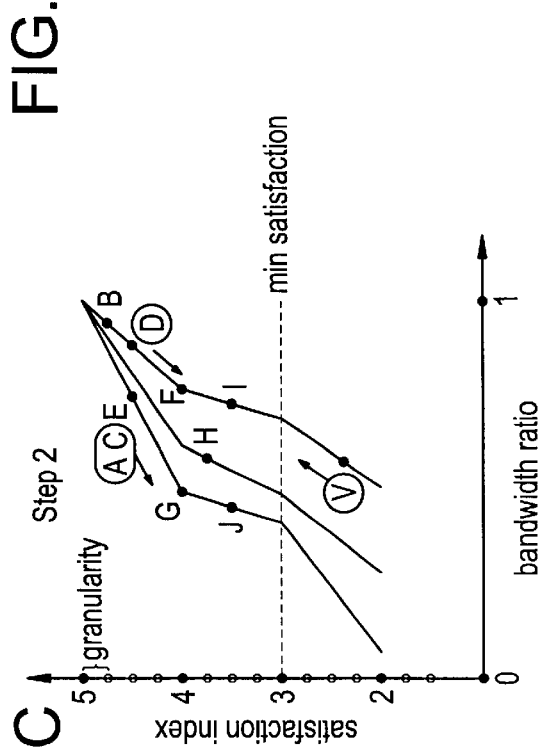

The elements of the soft-QoS controller constitute an adaptive control system for bandwidth allocation. This system is shown in FIG. 10. Connection admission is the responsibility of the soft-CAC module, and is based on the available capacity, the reference profile and the estimated grade-of-service (GoS). The new connection is accepted if the target GoS (GoS*) can be sustained.

Accepted connections can renegotiate their bandwidth requirements and softness during the session. For renegotiations, the soft-CAC module checks that the requested bandwidth is within the limits of the declared reference profile, and informs the satisfaction estimator of connections requesting bandwidth outside their reference profile. The soft QoS controller allocates bandwidth to renegotiation requests based on the satisfaction provided by the satisfaction estimator. Network-initiated renegotiation can be used to reallocate bandwidth from donor connections. For stability reasons, the satisfaction estimator can request the soft-CAC to temporary reject new connections.

IVE. Experimental Results

In this section the performance of the proposed soft-QoS controller with VBR+ interactive video traffic at variable network loads are evaluated. First, the experimental methodology and performance metrics used are given followed by simulation results of the controller on an ATM access switch.

IVF. Methodology

A realistic video traffic model representative of fully interactive distributed multimedia applications was developed. MPEP-2 compressed digital video was obtained using a commercially available video works product. Four 20-minute sequences of well-known action movies (Jurassic Park, Terminator 2, The Abyss, Star Wars) were used. Each sequence was encoded at five quality levels by changing the quantization scale from 4 to 12 in increments of 2. The resulting MPEG-2 frame-level bit counts were extracted from bit streams. At connection set-up time, each VBR+ source randomly selects one of the four movies. While a session is in progress, the original frame bit counts were dynamically scaled to reflect the traffic characteristics of a video server that supports interactive multimedia-on-demand (MoD) clients. The model selected interactive modes at random from uniform distribution of possible modes, such as fast-forward, rewind, play at different frame-rates, background and forward viewing, etc. An exponential distribution with an average is holding times reasonable for the selected mode was used to model the sojourn time among interactive modes.

An example of a multimedia system with multiple interactivity modes is described in D. Reininger, M. Ott, G. Michelitsch and G. Welling, "Scalable QoS Control for VBR Video Servers," *Proc. First IEEE Conference on Multimedia Signal Processing*, Princeton University, Princeton, N.J., June 1997, and M. Ott, G. Michelitsch, D. Reininger, G. Welling, "Adaptive QoS in Multimedia Systems", *Proc. Fifth JFIP International Workshop on Quality of Service*, 1WQOS'97, Columbia University, New York, May 1997. In this system, video display windows can be moved to the foreground or background of a user interface landscape See M. Ott, G. Michelitsch, D. Reininger, G. Welling, "An Architecture for Adaptive QoS and its Application to Multimedia Systems Design," to appear in *Computers and Communications*, Special issue on QoS.

When a video window is at the front it selects a softer profile than when it is at the background. In addition, background video can be of lower spatial resolution than foreground one. A quality widget can be attached to a video window to allow explicit control of frame display rate, and detail (given as a combination of quantization level and spatial resolution). A remote control widget enables "trick" modes such as fast-forward, rewind, jump-to-last-frame, jump-to-first-frame, etc.

A Java-based distributed software simulation was used to multiplex a variable number of VBR+ interactive MPEG video sources into the port of an ATM switch whose bandwidth allocation is managed by the soft-QoS controller. Each of the VBR+ connections was implemented as a separate Java thread and a synchronously renegotiates its soft-QoS. Renegotiation messages between the connections and the soft-QoS controller consisted of a bandwidth request (given in terms of a UPC traffic descriptor) and the index of a softness profile.

The following performance metrics were used:

ATM switch port utilization (U), measured as the ratio of average aggregated bandwidth allocated to the VBR+ connections to the OC-3 link capacity.

Low satisfaction rate (LSR), is the ratio of time (in video frame intervals of 33 msec.) an average connection spends at the low satisfaction region of its softness profile to the duration of the connection.

Low satisfaction mean duration (LSMD), is the time (in video frame intervals of 33 msec.) and average connection spends consecutively in the low satisfaction region of its softness profile.

Low satisfaction standard deviation (LSSD), is the standard deviation of the LSMD.

Reallocation rate (RR), is the rate of renegotiation requests received by the soft-QoS controller that require reallocation.

Reallocation signalling overhead (RSO), measures the ratio of signals generated to notify donors of a new allocation, resulted from the reallocation algorithm, to the number of signals generated by the connections' renegotiations.

IVH. Simulation Results

FIG. 12 depicts a table showing the performance of the soft-QoS controller in terms of the metrics described above. The simulation was run for about 20 real-time minutes (aprox. 85,000 frames). When the number of interactive video streams varies from 20 to 32, the port utilization varies from 65% to 95%. Each video stream requests QoS renegotiations about once every 3 seconds on an average. Thus, the soft-QoS controller processes on the order of 10 soft-QoS requests-per-second (r.p.s.). Of these requests, less than 5% require bandwidth reallocation to avoid falling below min.satisfaction (see RR in table). As shown in FIG. 13, the soft-QoS controller can maintain acceptable quality with high probability (above 0.95) even at very high utilization regimes. In particular, note that reallocation improves LSR by about an order-of-magnitude in the 80–85% utilization regime. Also, FIG. 14 shows that the reallocation algorithm significantly reduces the time an average connection spends in the low satisfaction region.

Each reallocation requires multiple signalling messages to notify the donor connections involved of the new allocation. FIG. 17 shows that the signalling overhead added for this purpose can be above 40%. The signalling load is a function of the number of donors involved in the reallocation. As described earlier the size of the connection donors list can be controlled with the pruning threshold, p. However, the smaller the number of potential donors smaller are the chances of the reallocation to succeed in bringing the recipient connection within the acceptable satisfaction region.

The sensitivity of the trade-off among signalling load, satisfaction index and the values of the pruning threshold are studied next. In these simulations, the number of multiplexed streams was kept constant (at 24 streams) and the pruning thresholds varied. The results are presented in FIG. 16.

As the pruning threshold (p) increases, the number of connection included into the donor group (and, correspondingly, the number of signals they generate) increases. Assuming the bandwidth allocations are randomly and uniformly distributed over some range, the dependency between p and the average size of the donor group is linear (because of linearity of the distribution function). The numbers in FIG. 16 and FIG. 17 support this conjecture: as p increases, the average signalling load, given by RSO, also increases approximately linearly up to a saturation point. The saturation point corresponds to the case where all connections are included into the donor's list.

As shown in FIG. 18, while increasing p increases the signaling load, it improves the soft-QoS parameters: LSR decreases, along with LSMD and LSSD. This decrease continues until saturation point for signaling load; after the saturation point, the value of the soft-QoS parameters begin to increase. The reason is that, after the saturation point, too many donor connections are involved in reallocation, which brings the overall soft-QoS down. This analysis and the results of simulations demonstrates that the pruning threshold, p, allows to balance the signaling load and the QoS of connections, by making an appropriate tradeoff decision.

In order to visually verify that the reallocation algorithm indeed maximizes the minimum satisfaction index, the minimum satisfaction index S of all multiplexed streams was computed and plotted against five (measured in video frame periods of 33 ms.). FIG. 9 shows a 500-frame snapshot of the behavior of the minimum satisfaction index S in the high utilization regime (28 streams). The figure clearly illustrates two major advantages of soft-QoS reallocations:

the minimum satisfaction spends significantly more time at the highest level (5);

the minimum satisfaction spends significantly less time in the low satisfaction region.

The processing requirements of the proposed soft-QoS controller produced results as follows. It was observed that about 160 renegotiations are generated per-second when the switch's port is loaded at about 80% utilization with interactive MPEG-2 video streams. In a standard configuration the controller took less than 5 msec. to process a renegotiation request. Thus, the current Java-based implementation of the controller can process more than 200 r.p.s. Considering that the renegotiation processing capacity of the switch controller can be significantly improved using a just-in-time compiler, native methods or a multiprocessor controller, it can be conclude that the soft-QoS controller can be implemented within the capabilities of currently available external switch controllers.

However, these evaluations consider only the processing requirements to compute an allocation once the negotiation request reaches the soft-QoS controller.

IVI. Conclusion

The current invention introduced soft quality-of-service (soft-QoS), a novel concept that bridges the gap between the efficient provision of network-level QoS and the requirements of multimedia applications. The concept of soft-QoS provides for the implementation of a flexible and efficient bandwidth allocation scheme for adaptive multimedia applications. The bandwidth allocation is implemented within a soft QoS controller for the $VBR^+$ ATM network service class. The performance of the soft-QoS controller for MPEG-2 interactive video over ATM with heterogeneous soft-QoS requirements.

The controller uses the connections' softness profile to compute a bandwidth allocation that maximizes the minimum satisfaction index of active connections.

Simulation results show that the satisfaction index of active connections is kept in the acceptable range, with very high probability, at high utilization regimes (80–90%), while maintaining processing requirements within the capabilities of current PC-based external switch controller. In addition, the additional signalling generated by reallocations of bandwidth during congestion can be linearly controlled through the algorithm's pruning threshold.

Although the results presented are based on softness profiles for video, the definition of soft-QoS is appropriate, for adaptive multimedia applications is general. The simulations utilize a baseline set of softness profiles. More exact softness profiles can be defined and refined as users' experience with distributed multimedia applications grows. New profiles can easily be incorporated as they become available.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed:

1. A distributed multimedia system having a soft quality of support comprising:

a plurality of clients a plurality of servers; and a network;

wherein each of said plurality of clients further comprises an application and a network interface card, wherein each of said plurality of servers further comprises a terminal quality of service controller, a data source and a server network interface card, and wherein said network provides soft quality of service support to said plurality of clients and said plurality of servers.

2. The distributed multimedia system of claim 1 wherein said network further comprises:

a backbone network;

an access network;

a quality of service controller;

wherein said quality of service controller is attached to said access network; and wherein said quality of service controller uses soft quality of service.

3. The distributed multimedia system of claim 2 wherein said quality of service controller is a personal computer.

4. The distributed multimedia system of claim 2 wherein said quality of service controller is embedded.

5. The distributed multimedia system of claim 2 wherein said backbone network comprises an edge switch and wherein said quality of service controller resides in said edge switch.

6. The distributed multimedia system of claim 2 wherein said quality of service controller is distributed in said backbone network.

7. The distributed multimedia system of claim 2 wherein an application can request bandwidth from a server and network in terms of soft quality of service while connection is in progress, said application can renegotiate soft quality of service requirements, wherein said quality of service controllers compute and negotiates bit-rate necessary to maintain quality.

8. The distributed multimedia system of claim 7, wherein said renegotiation can be invoked by a user or said network.

9. The distributed multimedia system of claim 7 wherein said renegotiation is sent to network elements.

10. The distributed multimedia system of claim 2 wherein said data source is a multimedia bit-rate source.

11. The distributed multimedia system of claim 10 wherein said quality of service is in the form of frame rate and frame detail.

12. The distributed multimedia system of claim 10 wherein said multimedia bit-rate source uses rate control to scale its bit-rate and quality.

13. The distributed multimedia system of claim 1 wherein said soft quality of service has a satisfaction index and a softness profile.

14. The distributed multimedia system of claim 13 wherein said softness profile is defined using a satisfaction index and a bandwidth ratio, wherein said bandwidth ratio is further defined as a ratio of allocated bandwidth to requested bandwidth.

15. The distributed multimedia system of claim 13 wherein said satisfaction index is graded from 2–5 with a granularity of G and said bandwidth ratio is graded from 0–1.

16. The distributed multimedia system of claim 13 wherein the softness profile for a bandwidth ratio r is calculated using the following formula:

$$L = \begin{cases} 0 & \text{if } 0 \leq s \leq 2, \\ 1 & \text{if } 2 \leq s \leq 3, \\ 2 & \text{if } 3 \leq s \leq 4, \\ 3 & \text{if } 4 \leq s \leq 5, \end{cases}$$

and

-continued $$r(s) = \begin{cases} C & \text{if } L = 0, \\ (s-2)/(B-C)+C & \text{if } L = 1, \\ (s-3)/(A-B)+B & \text{if } L = 2, \\ (s-4)/(1-A)+A & \text{if } L = 3. \end{cases}$$

wherein

A, B and C are three numbers that characterize bandwidth requirements of a client application and its performance requirement, $1 \geq A > B > C \geq 0$, and r(s) represents the bandwidth ratio.

17. A distributed multimedia system having a soft quality of service support, wherein said soft quality of service has a satisfaction index and a softness profile, wherein said softness profile is defined using the satisfaction index and a bandwidth ratio, wherein said bandwidth ratio is further defined as a ratio of allocated bandwidth to requested bandwidth.

18. A distributed multimedia system having a soft quality of service support, wherein said soft quality of service has a satisfaction index and a softness profile, wherein said satisfaction index is graded from 2–5 with a granurality of G and said bandwidth ratio is graded from 0–1.

19. A distributed multimedia system having a soft quality of service support, wherein said soft quality of service has a satisfaction index and a softness profile, wherein the softness profile for the bandwidth ratio r is calculated using following formulae:

$$L = \begin{cases} 0 & \text{if } 0 \leq r \leq C, \\ 1 & \text{if } C \leq r \leq B, \\ 2 & \text{if } B \leq r \leq A, \\ 3 & \text{if } A \leq r \leq 1, \end{cases}$$

and $$S(r) = \begin{cases} 2 & \text{if } L = 0, \\ (r-C)/(B-C)+2 & \text{if } L = 1, \\ (r-B)/(A-B)+3 & \text{if } L = 2, \\ (r-A)/(1-A)+4 & \text{if } L = 3. \end{cases}$$

wherein

A, B and C are three numbers that characterize bandwidth requirements of a client application and its performance requirement, $1 \geq A > B > C \geq 0$, and S (r) represents the softness profile as satisfaction index and bandwidth ratio.

20. A method of calculating bandwidth, said bandwidth being required to obtain a pre-determined satisfaction index s said method comprising:

a) calculating a factor L using the formula:

$$L = \begin{cases} 0 & \text{if } 0 \leq s \leq 2, \\ 1 & \text{if } 2 \leq s \leq 3, \\ 2 & \text{if } 3 \leq s \leq 4, \\ 3 & \text{if } 4 \leq s \leq 5, \end{cases}$$

\* \* \* \* \*